United States Patent [19]

Hochstein et al.

[11] Patent Number: 4,712,432
[45] Date of Patent: Dec. 15, 1987

[54] TORQUE SENSOR

[75] Inventors: Peter A. Hochstein, Troy; Nobuyuki Imai, Farmington Hills, both of Mich.

[73] Assignee: Al Sin Seiki Kabushiki Kaisha, Kariya, Japan

[21] Appl. No.: 789,108

[22] Filed: Oct. 18, 1985

Related U.S. Application Data

[63] Continuation-in-part of Ser. No. 676,859, Nov. 30, 1984, abandoned.

[51] Int. Cl.$^4$ .............................................. G01L 3/10
[52] U.S. Cl. ............................ 73/862.36; 73/862.33; 324/209
[58] Field of Search ........... 73/862.33, 862.34, 862.36, 73/DIG. 2, 779; 324/209

[56] References Cited

U.S. PATENT DOCUMENTS

| | | | |
|---|---|---|---|
| 2,826,064 | 3/1958 | Hastings | 73/862.33 |
| 3,329,012 | 7/1967 | Demuth | 73/862.33 |
| 4,356,732 | 11/1982 | Hachtel et al. | |
| 4,414,855 | 11/1983 | Iwasaki | |
| 4,485,682 | 12/1984 | Stroezel et al. | |
| 4,506,554 | 3/1985 | Blomkvist et al. | |

FOREIGN PATENT DOCUMENTS

| | | | |
|---|---|---|---|
| 0564147 | 7/1977 | U.S.S.R. | 73/862.33 |
| 667836 | 6/1979 | U.S.S.R. | |
| 838448 | 6/1981 | U.S.S.R. | |

OTHER PUBLICATIONS

Artamonov–"Converter of the Torsion Angle of a Shift into Digital Code", Izmer, Tekh., No. 7, pp. 33-35, Jul. 1978.

Primary Examiner—Charles A. Ruehl
Attorney, Agent, or Firm—Banner, Birch, McKie & Beckett

[57] ABSTRACT

A non-contacting, inductively coupled leakage flux torque sensor and method of measuring torque by determining the change in leakage flux at a surface discontinuity as a result of a torsion stress. Two identical, mirror image discontinuities are formed in a ferromagnetic member. The discontinuities may comprise sets of slots or ferromagnetic projections on facing end surfaces of the ferromagnetic member. As a result of torsional stress on the member, the discontinuities change shape and dimension or are displaced, resulting in a change in leakage flux. The change in leakage flux is detected by two differentially connected coils. A modulator-demodulator circuit provides a determination of torque as a function of the changed flux.

13 Claims, 15 Drawing Figures

TORQUE SENSOR

This application is a continuation-in-part of commonly assigned application Ser. No. 676,859 filed Nov. 30, 1984, now abandoned.

BACKGROUND OF THE INVENTION

The present invention relates to an apparatus and method for measuring torque. Specifically, the present invention is an apparatus and method for the measurement of torque in rotating shafts. Particularly, the invention is a non-contacting, inductively coupled, method and apparatus for sensing torque induced leakage flux changes in a rotating ferromagnetic rod or shaft. The invention has particular application in the measurement of torque in a power steering system of an automotive vehicle.

In the field of mechanical instrumentation, the measurement of torque in rotating shafts has always been difficult. Torque is either measured indirectly, as a function of power and speed, or measured directly. Large machines, operating at relatively high torques, and very small machines, operating at relatively low torques, preclude the use of indirect torque sensing means, thus requiring a direct measurement technique. In other areas as well, direct measurement is preferred. However, direct measurement of torsion in rotating shafts can only be accomplished by measuring the actual strain in the shaft or by measuring the reaction torque (moment) with respect to a stable reference platform, which is difficult in certain situations. Thus, an improved method and means for direct measurement of torsion in a rotating shaft is needed.

Conventional methods for the direct measurement of shaft torsion can generally be grouped into two categories: contacting and non-contacting.

Contacting methods of measuring torque, such as the application of strain gages to the strained member, are common. Strain gages are very reliable, convenient and economical sensors. However, they function best when used in conjunction with stationary members. When applied to a rotating shaft, wires connecting the gages must be run through slip rings to the source of excitation, detection and amplification. Slip rings are notoriously noisy (electrically), subject to wear, and expensive to apply. The current state of the art in rotating strain gage torque sensors employs rotating transformers to induce an A.C. excitation signal to a strain gage bridge (rossette), and then, by using a second inductively coupled winding, transfers the bridge output signal to the remote electronics.

Variants of such transformer coupled strain gage torque sensors are currently commercially available, at rather high cost. The complexity and cost of such rotary transformer instruments relegates their application to laboratory or test-stand environments.

A common non-contacting method of measuring torque generally involves measurement of magnetic properties. The change of magnetic properties of various alloys as a result of an induced stress is well known. In particular, the premeability of a magnetic material tends to increase due to tensile stress and tends to decrease due to compressive stress. This effect has been utilized in some torque transducers. For example, in commonly assigned U.S. Pat. No. 4,414,855 the change in permeability of a magnetic layer on the surface of a non-magnetic cylindrical rod is sensed by one or more pick-up coils located adjacent to a stressed rotating rod. For a given pick-up coil, the inductance of the coil is directly proportional to the permeability of the magnetic layer. Since the permeability of the magnetic layer is directly proportional to the stress applied thereto, the inductance of the pick-up coils is directly proportional to the stress applied to the magnetic layer. Thus the stress applied to the cylindrical rod including the magnetic layer thereon may be determined by detecting the inductance of the pick-up coils. However, temperature dependence of these same magnetic properties restricts the usefulness of such non-contacting sensors. Fabrication of power transmitting shafts using such alloys also presents many difficulties.

When a metallic member is magnetized, a leakage flux is generated at any point where a discontinuity, flaw, or defect in the material exists. The quantity of leakage flux, and therefore the sensitivity of sensing devices to the defect, is dependent upon the relative orientation of the defect and the field. The present invention uses such leakage flux principles and is based upon the well known technique of eddy current testing, wherein discontinuities, cracks, inclusions or other defects in metallic objects are detected by means of changes in the flux due to induced current flow. Eddy current testing is primarily used as a sorting method or as a quality assurance tool.

Specifically, eddy currents are typically generated within an object to be inspected by induction from an adjacent coil establishing an alternating excitation current. The eddy currents then generate magnetic fields which couple to the coil at the same frequency as that of the excitation current, but which may be of a different phase. The phase and amplitude of the induced voltages depend upon the structural characteristics of the object under test. The phase relationships may be measured by appropriate signal processing circuits.

The flow of eddy currents in a test object is governed by the skin effect phenomenon. The currents decrease exponentially with depth, depending on the shape of the object, its thickness, and its electromagnetic properties. In addition to the decrease of current amplitude as depth below the surface increases, the phase angle of the current increasingly lags the excitation signal. While eddy current testing has been used in the prior art, the present invention, however, applies the eddy current testing concept in a novel manner for achieving a more useful, more reliable, more sensitive torque sensor.

Another important limitation of prior art torque sensing devices with measure stress-induced material property variations in a rotating shaft, is the insensitivity of torque direction. Whether the torsional member is stressed clockwise or counterclockwise, the net induced material property change will be identical—at least in a perfectly elastic system. For many applications, such as automotive steering effort sensors, the sign (direction) of the applied torque is essential information.

SUMMARY OF THE INVENTION

The invention described herein is a non-contacting, inductively coupled, leakage flux torque sensor of novel construction and unique operating principle. It is far simpler, more useful, more sensitive, lower in cost, and more reliable than prior known torque sensors. It has an output which is linear with applied torque by a change in operating quadrant (sign). The invention has particular applicability in determining torque on, for example, a power steering or drive shaft of an automobile, although other applications are of course within the scope of the invention.

The present invention also comprehends an improved method of measuring torque in a ferromagnetic member. The method comprises the step of forming discontinuities, such as sets of slots or grooves, in the surface of the ferromagnetic member to which a torsion stress is applied. The discontinuities preferably are formed as the mirror image of one another so that one of the discontinutities is reversed in orientation with respect to the central axis of the ferromagnetic member from the other discontinuity. An induced current is then established within the ferromagnetic member by induction from a first coil adjacent the ferromagnetic member. The induced current thus creates an electrical excitation field and thereby generates a measured leakage flux at the discontinuities. The change in leakage flux is measured at each of the discontinuities by differentially connected secondary coils. The phase and amplitude of the induced current is derived from the output signals of the differentially connected secondary coils, thus allowing the torque on the ferromagnetic member to be determined as a direct function of the measured change in leakage flux. Alternatively, instead of using two sets of slots or grooves, the leakage flux, and hence torque, may be measured as a function of the displacement of ferromagnetic projections on a split sleeve.

The torque sensor of the present invention includes a primary coil for establishing an induced excitation current in a torsionally stressed ferromagnetic member preferably comprising two discontinuities, one the mirror image of the other, in the surface of the ferromagnetic member. Alternatively, the discontinuities which are ferromagnetic member may comprise a split sleeve having ferromagnetic projections. This thereby generates a magnetic leakage flux at the discontinuities or projections. The torque sensor further comprises two differentially connected secondary coils for measuring the change in leakage flux at each of the discontinuities. The output of the secondary coils is provided to a circuit for deriving phase and amplitude information from the differentially connected sensing coils, thus allowing torque to be determined as a function of the output voltage of the secondary coils.

DETAILED DESCRIPTION OF THE INVENTION

Figure 1:
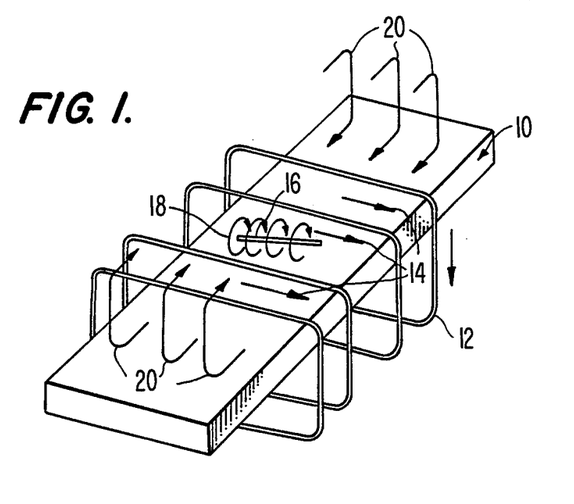
FIG. 1 is a schematic illustration of leakage flux generation at a surface discontinuity in a ferromagnetic member.

As shown schematically in FIG. 1, when a ferromagnetic member 10 is placed within an axial solenoid coil 12 establishing an excitation current, eddy currents, shown generally by arrows 14, are generated within member 10. A discontinuity, flaw, or defect in the surface is represented at 16. When such discontinuities occur within the skin depth of the ferromagnetic member, the leakage flux at the discontinuity, shown generally at arrows 18, is higher than the induced flux, shown generally by arrows 20, at other parts of the contiguous surface, since the permeance of the discontinuity is several orders of magnitude lower than the permeance within the surface of the ferromagnetic material. The magnitude of the leakage flux 18, which couples to the coil at the same frequency as that of the excitation current, is a direct function of the size, number and depth of the surface discontinuity.

Figure 2A:
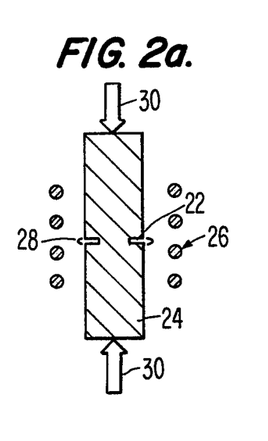
FIGS. 2a-c are a schematic illustration of the changes in shape and dimension of a surface discontinuity as the result of stress forces.
Figure 2B:
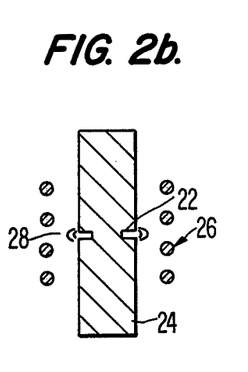
Figure 2C:
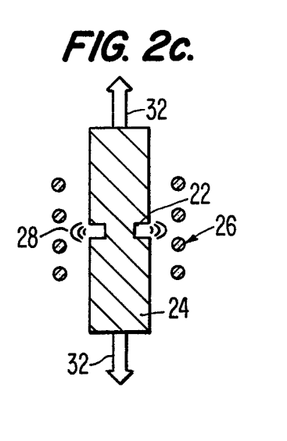

As a member is placed under a stress force, discontinuities in the surface will either shrink or expand. FIGS. 2a-c illustrate a circumferential slot or groove 22 inscribed in the surface of a cylindrical rod 24 orthogonal to the central axis of cylindrical rod 24. Cylindrical rod 24 is surrounded by an excitation coil, generally shown at 26. The leakage flux at the circumferential slot is schematically shown by flux lines 28. With no stress forces on rod 24, as shown in FIG. 2b, only nominal leakage flux is generated at groove 22. As shown in FIG. 2a, however, in the simple case where a compressive force 30 is applied to rod 24, the circumferential slot 22 is compressed and made smaller, thereby reducing the leakage flux at groove 22 from that of the unstressed state shown in FIG. 2b. Conversely, as shown in FIG. 2c, when a tensile force 32 is applied to cylindrical rod 24, circumferential groove 22 is increased in size, thereby increasing the leakage flux from that of the unstressed state shown in FIG. 2b. In this simplified example, groove dimension was the only factor considered as affecting leakage. In fact, however, other factors, such as resistivity and permeability of the ferromagnetic shaft, as well as the amplitude and frequency of the excitation field also affect the leakage flux. Still other factors which affect the leakage flux are temperature and mechanical or electronic instability.

Figure 3:
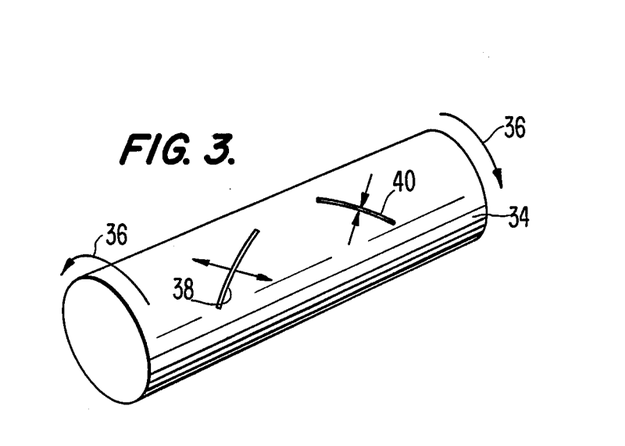
FIG. 3 is a perspective, schematic view of tensile and compressive forces acting on discontinuities on the surface of a ferromagnetic magnetic torsion shaft.

FIGS. 2a-c illustrate the simple case of pure compressive or tensile stresses. In FIG. 3, a ferromagnetic torsion bar 34 is illustrated which is subject to a torsional stress, generally represented by arrows 36. Two identical surface discontinuities, such as slots or grooves 38 and 40, are shown in torsion bar 34. Slots 38 and 40 are placed at an angle with respect to the central axis of torsion bar 34. If slots 38 and 40 are parallel to the magnetic field generated, i.e., parallel to the axis of torsion bar 34, virtually no increase flux leakage is generated. Conversely, if slots 38 and 40 are made more orthogonal with respect to the axis of bar 34, improved sensitivity to flux changes results. The preferred angle of slots 38 and 40 is between 60°–75°, which provides maximum tensional strength and maximum sensitivity to leakage flux. Additionally, slots 38 and 40 are opposite in sense, that is mirror images of one another, so that one slot is reversed in orientation with respect to the central axis of bar 34 from the other slot. Although only a single slot 38 and a single slot 40 is shown in FIG. 3 for simplicity of illustration, ferromagnetic torsion bar 34 may preferably be provided with more than one slot in each surface discontinuity.

As shown clearly in FIG. 3, as bar 34 is subjected to torsional stresses 36, slot 40 will tend to shrink or close, while slot 38 will tend to expand or open.

In an elastic, symmetrical system, the equal and opposite forces on the discontinuities shown in FIG. 3 may be conveniently measured by a differential measurement technique. A single primary coil preferably is used to establish an excitation field, while two differentially connected secondary coils preferably are used for sensing the change in leakage flux. In such a system, common mode effects, such as temperature induced material property changes, are effectively cancelled, while the strain sensitivity is doubled.

Figure 4A:
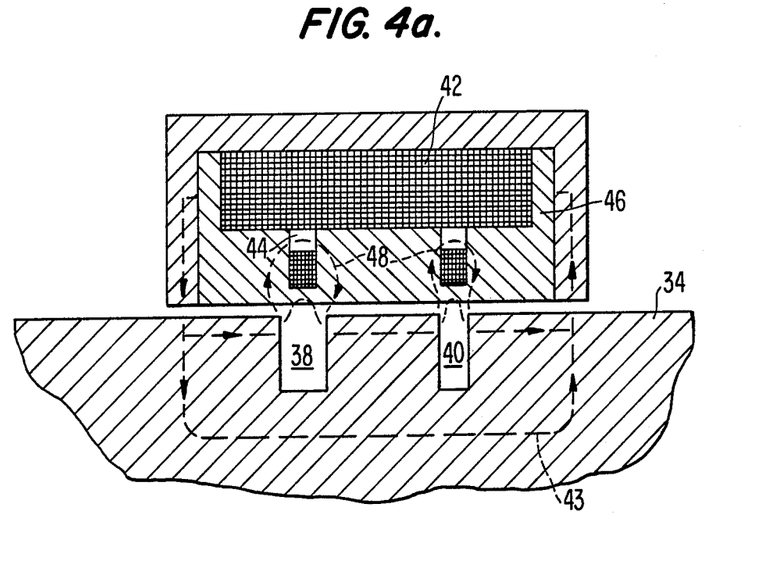
FIG. 4A is a cross-sectional view of the torsion shaft shown in FIG. 3 with the shaft surrounded by a primary excitation coil and two differentially connected secondary sensing coils.
Figure 4B:
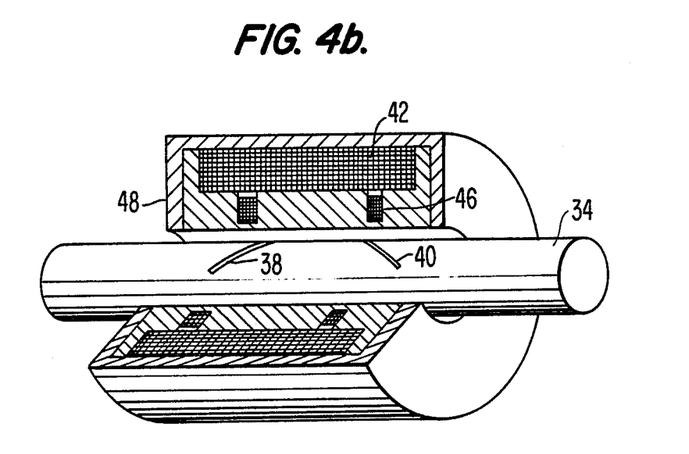
FIG. 4B is a perspective view of the arrangement shown in FIG. 4A.

In FIGS. 4A and B, ferromagnetic torsion bar 34 is shown surrounded by a single primary excitation coil 42 and two differentially connected sensing coils 44 and 46. Torque sensors of the type disclosed herein are extremely sensitive to extraneous magnetic fields. If the sensing coils 44 and 46 were not differentially connected, the system would not be operable because of extraneous magnetic fields. Primary coil 42 serves to create an induced flux, shown generally at 43. Differentially connected sensing coils 44 and 46 are located adjacent to slots 38 and 40, respectively. When a torsional stress is applied to bar 34, leakage flux 48 at slot 38 increases, whereas an equal decrease of leakage flux 48 occurs at slot 40. Since these changes are summed differentially by the differentially connected secondary coils 44 and 46, an effective strain equal to twice the actual strain can be measured.

The use of separate excitation and differential detection coils allows a relatively high level of electromagnetic excitation, and a high degree of sensitivity in leakage flux detection. Furthermore, the inherent common mode rejection characteristics of a balanced differential sensor pair permits intrinsic cancellation of deleterious influences such as stray magnetic fields, temperature effects and mechanically induced variations.

Figure 5:
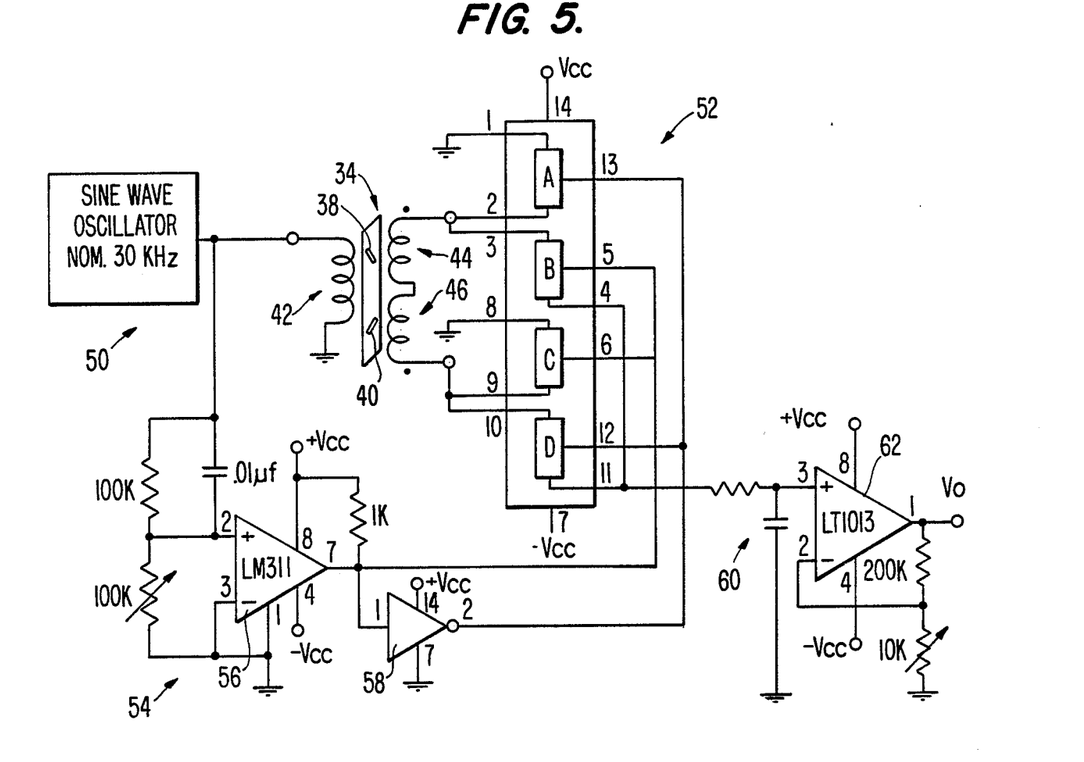
FIG. 5 is a circuit diagram of a circuit for deriving phase and amplitude information from the differentially connected sensing coils.

FIG. 5 shows a generally conventional circuit for determining the torque on bar 34, although any other circuit configuration for deriving phase and amplitude information from the differentially connected sensing coils may also be used. In FIG. 5 a sinewave oscillator 50 is connected to primary coil 42 and provides the excitation current to induce flux in bar 34. Secondary coils 44 and 46 are connected to a quad bilateral switch 52. A zero crossing detector 54 comprising operational amplifier 56 and logic inverter 58 connect sinewave oscillator 50 to switch 52. Amplifier 56 consists of a comparator having a zero reference. The output of switch 52 is filtered by integrating circuit 60. A second operational amplifier 62 amplifies the output of integrator 60. In operation, zero crossing detector 54 produces square wave positive pulses at output 7 of comparator 56 for positive excursions of the input sinewave, while the output 2 of inverter 58 produces positive pulses for negative excursions of the input sinewave. Positive pulses at 7 turn on switches B and C which complete the secondary circuit of coils 44 and 46 and produce an output current to integrator 60. Positive pulses at 2 turn on switches D and A which likewise complete the current of coils 44 and 46 and produce an output current to integrator 60.

Figure 6:
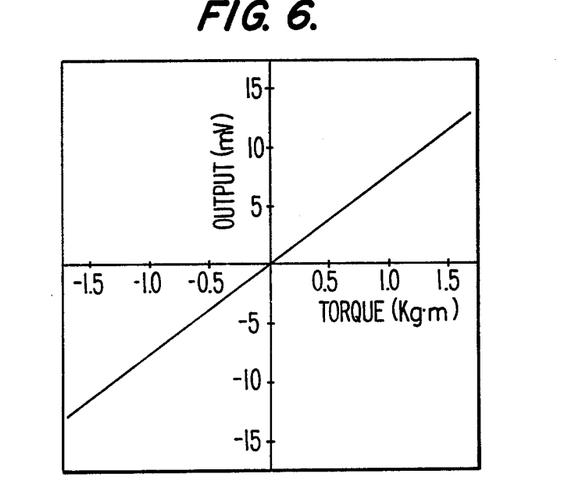
FIG. 6 is a graph of the output signal of the sensing coils plotted against torque.

The invention is applied to a specific example as follows. A cylindrical torsion bar of tool steel with an outside diameter of 12.7 mm was equipped with two sets of slots 45° to the central axis of the rod. Although the specific example tested used a 45° angle, it is preferred to use an angle between 60°–75° to maximize torsional strength and sensitivity to leakage flux. Each set of slots consisted of four grooves, each 12 mm long by 0.10 mm wide by 1.0 mm deep cut into the surface by electrical discharge machining. Although it is possible to use milled or etched slots, such techniques cannot achieve the small slot dimensions necessary for the desired sensitivity. Accordingly, electrical discharge machining is the preferred technique for making the slots. Additionally, the depth of the slots should be at least 4–5 times as great as the slot widths for effective sensitivity. Utilizing the circuit shown in FIG. 5, the data shown in FIG. 6 was obtained. In FIG. 6, the output voltage represents the output of integrator circuit 60; this output signal is linear with respect to the applied torque. Any circuit of either bridge or differential configuration which can extract amplitude and phase information from the sensing coils may be used, however, rather than the circuit shown in FIG. 5.

The 12.7 mm diameter torque shaft utilized in the example is capable of sustaining a torque in excess of 15 kilograms/meter for an internal maximum stress of approximately 700 kilograms per square meter. Such a shaft would have particular applicability in automotive power steering applications.

The sensitivity of the torque sensor of the present invention may be increased significantly by using a hollow, tubular sleeve, or torque sensing tube, as described more fully below in connection with FIG. 7. With such a sleeve, the significant increase in strength sensitivity is offset only marginally by increasing internal stress. Additionally, sensitivity may be increased by changes in slot angle. By moving the slot angle towards a more orthogonal orientation to the bar axis than the 45° angle described above, sensitivity of the torque sensor improves with only slight compromises in fatigue life. Decreasing slot widths also increases strain sensitivity, as the physical decrease in slot width for a given induced strain shows a greater percentage change than for narrower slots. However, the cost and difficulty of producing slots of less than 100 micro-width must be considered. Sensitivity may also be increased by increasing the number of slots around the circumferences of the torque sensing bar.

Figure 7:
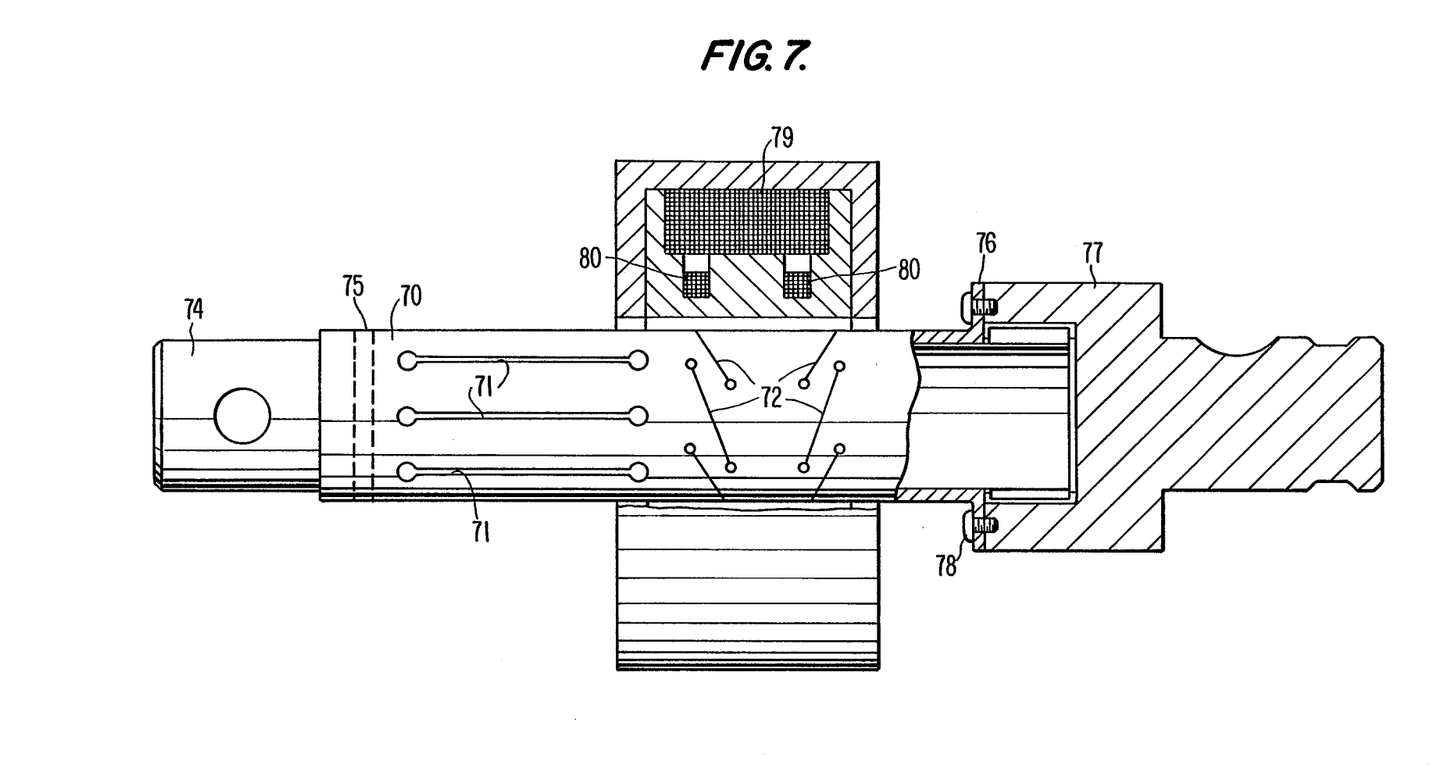
FIG. 7 is a cross-sectional view of a sleeve-type torque sensor according to the present invention.

As shown in FIG. 7, the torque sensor of the present invention may comprise a hollow, tubular sleeve or torque sensing tube 70. A plurality of slots 72 are cut, preferably by electrical discharge machining, through the sleeve. Cutting slots 72 through sleeve 70 is preferred since, when a solid rod is used as a torque sensing element, as shown in FIGS. 4A and 4B, high stress concentrations result where the slots end, i.e., at the bottom surface of the slots. Moreover, these is no torque sensing advantage to the material remaining in the slot when a solid rod is used.

As shown in FIG. 7, sleeve 70 is fixed about an input shaft 74 by a pin 75. Of course other forms of connection may also be used. In the particular form of the invention shown, sleeve 70 may be formed with a flange 76 which is fixed to an output shaft 77 by screws 78 or a similar connection. A sensing coil, comprising an exciting coil 79 and two differentially connected pick-up coils 80, is provided to detect torque, as explained above. Slots 71 may be provided in tube 70 to torsionally weaken the tube for any particular applications in which such torsional weakening is desired. Since slots 71 are parallel to the axis of shaft 74, they do not affect the leakage flux.

Slots 72 are preferably oriented at approximately 60°–75° with respect to the horizontal axis of tube 70. If slots 72 were at 0°, i.e., aligned with the horizontal axis, there would be no sensitivity to a change in leakage flux. Maximum sensitivity occurs when the slots are perpendicular to the horizontal axis. However, a perpendicular slot would result in destruction of tube 70 by cutting it into two distinct sections. The preferred 60°–75° angle, or aspect ratio, of the slots provides maximum tube strength and maximum leakage flux sensitivity.

In a specific example of the embodiment shown in FIG. 7, tube 70 has walls with a thickness of approximately 0.5 mm. The wall thickness could vary from approximately 0.2 mm to several millimeters. However, if the tube is too thin, its strength decreases to the point where it is too fragile to be practically usable. Slots 72 are cut through the tube wall and have a width of approximately 0.1 mm and a length of approximately 5–12 mm. Sensitivity to leakage flux will be increased if the slots are thinner.

Figure 8A:
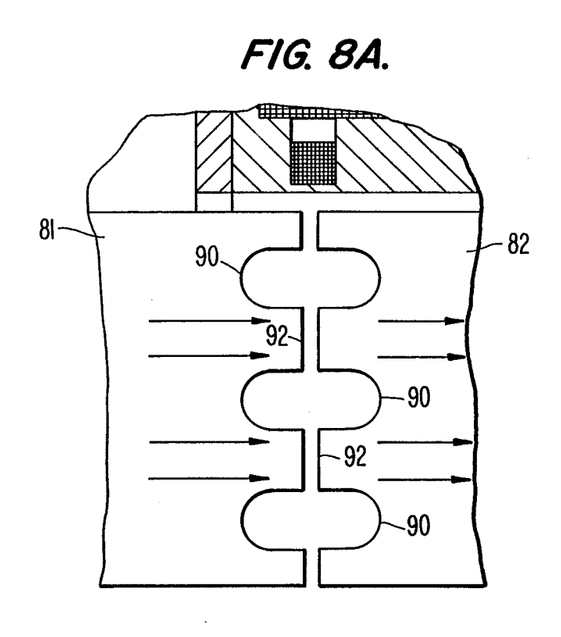
FIG. 8A is a partial side view of a torque sensor comprising a split sleeve having ferromagnetic projections, with the torque sensor in a neutral position.
Figure 8B:
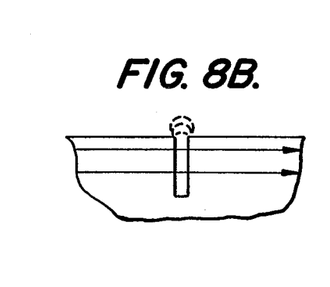
FIG. 8B is a schematic illustration of the leakage flux from the sleeves shown in FIG. 8A.
Figure 9A:
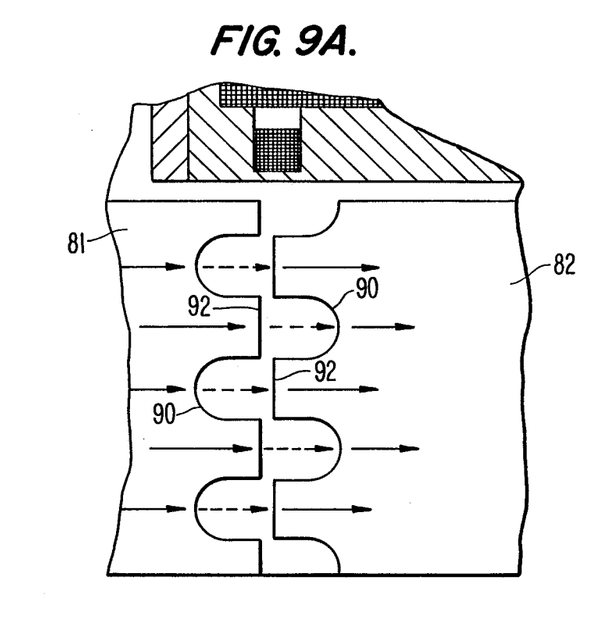
FIG. 9A is a partial side view of the torque sensor shown in FIG. 8A with the sleeve segments displaced by a torque.
Figure 9B:
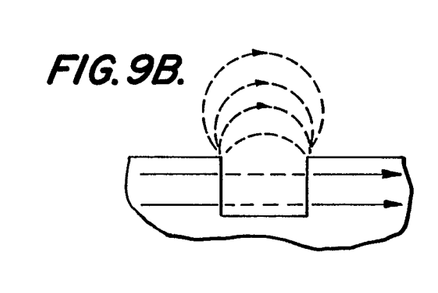
FIG. 9B is a schematic illustration of the leakage flux from the sleeves shown in FIG. 9A.
Figure 10:
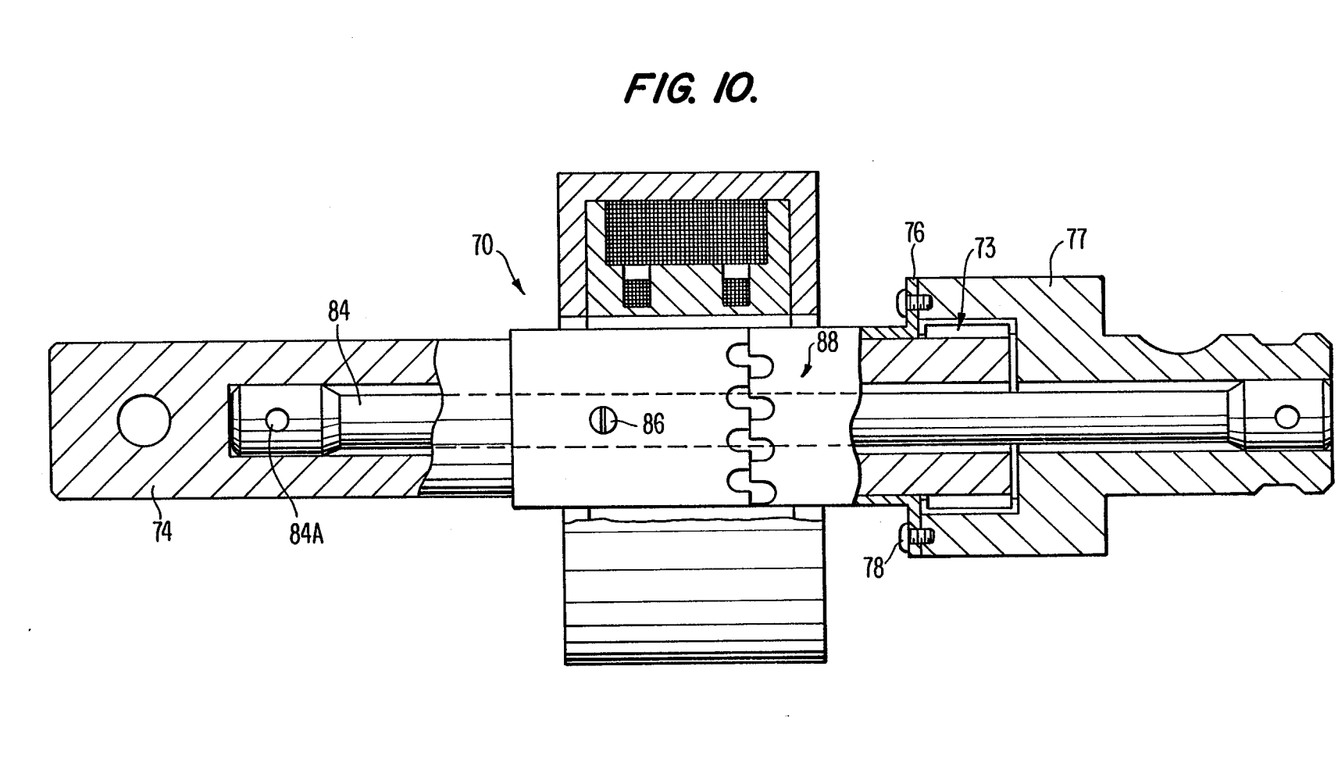
FIG. 10 is a cross-sectional view of a torque sensor device using a split sleeve, as shown in FIGS. 7 and 8, and including a primary excitation coil and two differentially connected secondary sensing coils.

As shown in FIGS. 8A–10, the torque sensing sleeve may be formed in two discreet sections 81, 82. A torsion carrying bar 84 passes through the sleeves, as shown in FIG. 10. Sleeve 81 is connected to torsion bar 84 by pin 86 or a similar connection. Sleeve 82 is connected to output shaft 77 at flange portion 76 thereof by screws 78. A sensing coil, comprising an exciting coil and differentially connected pick-up coils, is provided, as previously described. Each sleeve section 81, 82 includes a somewhat scalloped end surface 88, i.e., an end surface comprising a series of inwardly curved, concave segments 90 separated by projecting segments 92. Other irregularly shaped, end surfaces may also be used. In the embodiment of FIGS. 8A–10, the change in leakage flux is measured as a result of the displacement of adjacent ferromagnetic projections 92 rather than the displacement of slots in the sleeve as described above.

Shown in FIG. 8A with a flux leakage as depicted in FIG. 8B, the torque sensor is in a nominally 50% coupled, neutral state. Projections 92 are either decoupled or further coupled by an input torque to yield a corresponding increase or decrease in the leakage flux resulting from the gap between the split sleeves. As shown in FIG. 9A, projections 92 are further coupled to increase the leakage flux, as depicted in FIG. 9B.

Although the invention has been described with respect to a preferred embodiment, it will be obvious to those of ordinary skill that numerous changes and modifications are possible, and the invention is defined and limited only by the following claims.

We claim:

1. A method of measuring torque in a ferromagnetic member comprising:
   providing a ferromagnetic member;
   forming at least two, identical sets of parallel slots in said ferromagnetic member, one of said sets of parallel slots being the mirror image of said other set so that said one set is reversed in orientation with respect to the central horizontal axis of said ferromagnetic member, each of said sets of slots placed at an angle of 60°–75° with respect to the central horizontal axis of said ferromagnetic member;
   establishing an induced current within said ferromagnetic member by induction from a first coil adjacent to said member thus creating an electrical excitation field for said ferromagnetic member thereby generating a known leakage flux at said slots;
   subjecting said ferromagnetic member to a torsional stress;
   measuring the change in leakage flux at each of said slots, caused by said torsional stress changing the dimensions of said slots, said change in leakage flux being measured by two differentially connected secondary coils, and measuring a changed phase and amplitude of said excitation field from the output signals of said secondary coils.

2. A method as recited in claim 1 further comprising the step of determining the torque on said ferromagnetic member as a function of said measured change in leakage flux.

3. A method as recited in claim 1 wherein the step of forming said slots further comprises making the depth of said slots at least 4 times greater than their width.

4. A method as recited in claim 1 wherein said step of providing a ferromagnetic member further comprises providing a tubular ferromagnetic member.

5. A method as recited in claim 4 wherein said step of forming said sets of slots comprises forming said slots completely through the wall of said tubular ferromagnetic member.

6. A method of measuring torque in a ferromagnetic member comprising:
   providing a ferromagnetic member comprising two tubular adjacent sections having uniformly spaced, facing circumferential end surfaces;
   connecting one of said tubular adjacent sections to each of the input and output portions of a torsion carrying bar so that said circumferential end surfaces are facing each other;
   forming a series of cut out portions around the circumference of the facing end surfaces of said tubular adjacent sections;
   establishing an induced current within said ferromagnetic member by induction from a first coil adjacent to said member thus creating an electrical excitation field for said ferromagnetic member thereby generating a known leakage flux at said tubular adjacent sections
   subjecting said torsion carrying bar to a torisonal stress;
   measuring the change in leakage flux caused by said torsional stress displacing said tubular adjacent sections, said change in leakage flux being measured by two differentially connected secondary coils, and measuring a changed phase and amplitude of said excitation field from the output signals of said secondary coils.

7. A torque sensor comprising:
a ferromagnetic member having at least two discontinuities, said discontinuities positioned at an angle of 60°–75° with respect to the central horizontal axis of said ferromagnetic member;
a primary coil for establishing an induced excitation current in said ferromagnetic member thereby generating a magnetic leakage flux at said discontinuities;
two differentially connected secondary coils, a different one of said secondary coils for measuring the change in leakage flux at each of said discontinuities when a torsional stress is applied to said ferromagnetic member; and
amplitude and phase means for deriving the amplitude and phase of the induced current output of said secondary coils.

8. A torque sensor as recited in claim 7 wherein a different one of said secondary coils is adapted to be positioned adjacent each of the discontinuities in the ferromagnetic member.

9. A torque sensor as recited in claim 7 wherein said discontinuities each have a depth of at least 4 times greater than their width.

10. A torque sensor as recited in claim 7 wherein said ferromagnetic member comprises a tubular sleeve.

11. A torque sensor as recited in claim 10 wherein said discontinuities are slots formed completely through the wall of said tubular sleeve.

12. A torque sensor comprising:
a ferromagnetic member comprising two distinct tubular adjacent sections having uniformaly spaced facing end surfaces;
a torsion carrying bar, one of said tubular sections being connected to an input portion of a torsion carrying bar and the other of said tubular sections being connected to an output portion of said bar;
a series of cut-out portions formed around the circumference of the facing end surfaces of said tubular adjacent sections;
a primary coil for establishing an induced excitation current in said ferromagnetic member thereby generating a magnetic leakage flux between said sections;
two differently connected secondary coils for measuring the change in leakage flux caused at said tubular adjacent sections when a torsional stress displacing said tubular adjacent sections is applied to said torsion carrying bar; and
amplitude and phase means for deriving the amplitude and phase of the induced current output of said secondary coils.

13. A torque sensor as recited in claim 12 further comprising ferromagnetic projections on facing end surfaces of said tubular adjacent sections.

* * * * *

UNITED STATES PATENT AND TRADEMARK OFFICE
CERTIFICATE OF CORRECTION

PATENT NO. : 4,712,432

DATED : December 15, 1987

INVENTOR(S) : Peter A. Hochstein et al.

It is certified that error appears in the above-identified patent and that said Letters Patent is hereby corrected as shown below:

Title Page:

Please correct the [73] Assignee information as follows:

— Aisin Seiki Kabushiki Kaisha —

Signed and Sealed this

Ninth Day of August, 1988

Attest:

DONALD J. QUIGG

*Attesting Officer*  *Commissioner of Patents and Trademarks*